(12) United States Patent
Saukkonen et al.

(10) Patent No.: US 11,555,275 B2
(45) Date of Patent: Jan. 17, 2023

(54) METHOD OF MANUFACTURING A FILM HAVING LOW OXYGEN TRANSMISSION RATE VALUES

(71) Applicant: Stora Enso OYJ, Helsinki (FI)

(72) Inventors: Esa Saukkonen, Lappeenranta (FI); Isto Heiskanen, Imatra (FI); Katja Lyytikäinen, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 405 days.

(21) Appl. No.: 16/614,164

(22) PCT Filed: May 17, 2018

(86) PCT No.: PCT/IB2018/053454
§ 371 (c)(1),
(2) Date: Nov. 15, 2019

(87) PCT Pub. No.: WO2018/211441
PCT Pub. Date: Nov. 22, 2018

(65) Prior Publication Data
US 2020/0173109 A1 Jun. 4, 2020

(30) Foreign Application Priority Data

May 18, 2017 (SE) .................................. 1750625-4

(51) Int. Cl.
*D21H 11/18* (2006.01)
*B32B 5/06* (2006.01)
*B32B 23/06* (2006.01)
*B32B 23/08* (2006.01)
(Continued)

(52) U.S. Cl.
CPC .............. *D21H 11/18* (2013.01); *B32B 5/06* (2013.01); *B32B 23/06* (2013.01); *B32B 23/08* (2013.01);
(Continued)

(58) Field of Classification Search
CPC ...... D21H 11/18; D21H 25/04; D21H 25/005; D21H 27/10; B32B 5/06; B32B 23/06;
(Continued)

(56) References Cited

U.S. PATENT DOCUMENTS

| 10,000,614 B2 | 6/2018 | Tammelin et al. |
| 2003/0056915 A1* | 3/2003 | Hietanen ............... D21H 11/02 |
| | | 162/135 |
| 2010/0316863 A1 | 12/2010 | Kumamoto et al. |

FOREIGN PATENT DOCUMENTS

| CN | 1396972 A | 2/2003 |
| EP | 2186939 A2 * | 5/2010 ............. D21F 11/00 |

(Continued)

OTHER PUBLICATIONS

International Search Report for PCT/IB2018/053454, dated Apr. 9, 2018.
(Continued)

*Primary Examiner* — Jacob T Minskey
*Assistant Examiner* — Matthew M Eslami
(74) *Attorney, Agent, or Firm* — Greer, Burns & Crain, Ltd.

(57) ABSTRACT

A method of manufacturing a film having an oxygen transmission rate (OTR) value in the range of 0.1 to 200 cc/m²*24 h at 23° C., 50% relative humidity (RH), and an OTR value in the range of 0.1 to 2000 cc/m²*24 h at 38° C. at 85% RH, comprising at least 60% by weight nanocellulose based on the weight of the total amount of fibers in the film, wherein the method comprises the steps of, providing an aqueous suspension comprising said nanocellulose; forming a web from said aqueous suspension; calendering said web at a line load of at least 40 kN/m, and at a temperature of at least 60° C. wherein said film is formed and said web has an OTR value in the range of 50 to 10 000 cc/m²*24 h at 23° C., 50% RH before said calendering step, or more
(Continued)

preferably in the range of 500 to 5000 cc/m²*24 h at 23° C., 50% RH before said calendering step.

20 Claims, 1 Drawing Sheet

(51) Int. Cl.
*D21H 25/04* (2006.01)
*B82Y 30/00* (2011.01)
(52) U.S. Cl.
CPC ........ *D21H 25/04* (2013.01); *B32B 2262/062* (2013.01); *B82Y 30/00* (2013.01)
(58) Field of Classification Search
CPC . B32B 23/08; B32B 2262/062; B32B 29/005; B32B 2307/7244; B32B 2439/70; B32B 27/10; B82Y 30/00; C08J 2301/02; C08J 2423/04; C08J 5/18; C08J 7/0427; C08J 7/048; C08L 1/02
See application file for complete search history.

(56) References Cited

FOREIGN PATENT DOCUMENTS

| | | | |
|---|---|---|---|
| EP | 2184299 | A1 | 12/2010 |
| JP | 11320802 | A * | 11/1999 |
| JP | 11320802 | A | 11/1999 |
| JP | 2001288692 | A | 10/2001 |
| JP | 2014196114 | A | 10/2014 |
| JP | 2015502835 | A | 1/2015 |
| JP | 2017000016 | A | 1/2017 |
| WO | 2016207783 | A1 | 12/2016 |
| WO | 2017046751 | A1 | 3/2017 |
| WO | 2017046755 | A1 | 3/2017 |
| WO | WO-2017046755 | A1 * | 3/2017 ............... B29D 7/01 |
| WO | 2018083592 | A1 | 5/2018 |
| WO | 2018189698 | A1 | 10/2018 |

OTHER PUBLICATIONS

Costa V.L.D. et al., "Effect of hot calendering on physical properties and water vapor transfer resistance of bacterial cellulose films", Journal of Material Science, vol. 51, pp. 9562-9572; abstract; pp. 9564, 9567; table 3, 2016.

Fellers et al.,"Kalandrering", Pappersteknik: Institutionen foer Pappersteknik KTH, 245-252, 1998.

Kumar, Vinay, et al., Substrate role in coating of microfibrillated cellulose suspensions, Cellulose (2017), 24:1247-1260.

* cited by examiner

METHOD OF MANUFACTURING A FILM HAVING LOW OXYGEN TRANSMISSION RATE VALUES

This application is a U.S. National Phase under 35 U.S.C. § 371 of International Application No. PCT/IB2018/053454, filed May 17, 2018, which claims priority under 35 U.S.C. §§ 119 and 365 to Swedish Application No. 1750625-4, filed May 18, 2017.

TECHNICAL FIELD

The present invention relates to a method of manufacturing a thin film comprising nanocellulose, such as microfibrillated cellulose, having a low oxygen transmission rate value especially in tropical conditions, i.e. high temperature and high relative humidity. In particular the invention relates to a manufacturing method comprising a calendering step.

BACKGROUND

In paper manufacturing, calendering is the process of smoothing the surface of the paper by pressing it between cylinders or rollers, i.e. the calenders, at the end of the papermaking process. An additional set of calenders or supercalenders used after the papermaking process produce an even smoother, thinner paper called supercalendered paper. For these paper grades, calendering is done mainly to improve gloss and printability of paper. Greaseproof thin papers such as glassine (50-90 gsm) are traditionally calendered to provide improved grease-resistance. However, this particular calendering process does not provide oxygen or gas barrier properties to the greaseproof paper, thus limiting the field of use of the papers. The main target for calendaring of paper is to smoothening of the surfaces. Typically densification is avoided as much as it is technically possible (because high caliber gives better bending stiffness and opacity). Greaseproof papers are surface treated with chemicals before calendering, in order to improve calendering effect. For films comprising cellulose fibers or polymers, including nanocellulose or microfibrillated cellulose (MFC), the oxygen and gas barrier properties of the film usually deteriorate in humid conditions. This is particularly obvious at tropical conditions, but might also occur due to temperature and humidity variations causing surface condensation.

Current prior art shows various solutions to solve the problem with OTR and gas barrier properties at high humidity levels, such as surface treatment with inorganic nanoparticles (ALD coating) or extrusion coating films with thermoplastic polymers having good water vapor resistance. In order to ensure low moisture or water contact with the film, it is required that both sides are coated with at least one water vapor barrier. Such complex structures might bring other disadvantages such as biodegradability and sustainability aspects, or non-profitable cost structure.

Despite the fact that a film is laminated or treated on either one or both sides, moisture migration might occur e.g. upon long exposure in high humid conditions or when being in contact with liquids. In some applications, it is preferable that the untreated (coated, laminated, surface treated) film itself has some moisture resistance. Therefore, there is a need to improve the barrier properties of the MFC films especially in humid conditions.

SUMMARY

It is an object of the present disclosure, to provide a film having improved oxygen transmission rate value, especially at tropical conditions, and a method of manufacturing said film.

The invention is defined by the appended independent claims. Embodiments are set forth in the appended dependent claims and in the following description.

According to a first aspect there is a method of manufacturing a film having an oxygen transmission rate (OTR) value in the range of 0.1 to 200 cc/m$^2$*24 h at 23° C., 50% relative humidity (RH), and an OTR value in the range of 0.1 to 2000 cc/m$^2$*24 h at 38° C. at 85% RH, comprising at least 60% by weight nanocellulose based on the weight of the total amount of fibers in the film, wherein the method comprises the steps of, providing an aqueous suspension comprising said nanocellulose; forming a web from said aqueous suspension; calendering said web at a line load of at least 40 kN/m wherein said film is formed, and at a temperature of at least 60° C., wherein said web has an OTR value in the range of 50 to 10 000 cc/m$^2$*24 h at 23° C., 50% RH before said calendering step, or more preferably in the range of 500 to 5000 cc/m$^2$*24 h at 23° C., 50% RH before said calendering step.

By calendering a web having an OTR value in this range, and under these conditions, a film having a low OTR value, i.e. having good oxygen barrier properties is provided. The improvement in OTR value is surprisingly seen at a high relative humidity of 85% RH, i.e. in tropical conditions. The film further shows less variations in density and/or transmittance as compared to conventionally manufactured films.

The line load may be at least 60 kN/m, or at least 100 kN/m. By using a high line or nip load and having a high moisture content in the web, i.e. above what is conventionally used in paper making, a surprising improvement of the barrier properties of the film is achieved.

The calendering step may be performed at a temperature of at least 80° C., or even at least 100° C., or at least 140° C. The cylinders may have the same or different temperatures.

The calendering step may be performed in any one of a soft nip calender, an extended calender, a hard nip calender, a belt calender and a shoe calender.

The calendering step is however preferably performed in at least one soft nip, or optionally one soft calender cylinder against one hard calender cylinder. Hard nip is not preferred in method of the present invention, because it increases density variations which can be seen as increase in gloss variations and transmittance variations.

The aqueous suspension may comprise more than 80% by weight nanocellulose based on the weight of the total amount of fibers in the film and/or normal fibers in a range of 0 to 20% by weight based on the weight of the total amount of fibers in the film.

The normal fibers may be a chemical pulp.

The OTR value of said film may be in the range of from 0.1 to 180 cc/m$^2$*24 h at 23° C., 50% RH, or the range if 0.1 to 100 cc/m$^2$*24 h at 23° C., 50% RH, or in the range of 0.1 to 60 cc/m$^2$*24 h at 23° C., 50% RH.

The OTR value of said film may be in the range of 0.1 to 200 cc/m$^2$*24 h at 38° C., 85% RH, or in the range of 0.1 to 100 cc/m$^2$*24 h at 38° C., 85% RH, or in the range of 0.1 to 60 cc/m$^2$*24 h at 38° C., 85% RH.

The nanocellulose and/or normal fibers may be any one of softwood and hardwood fibers or a mixture or combination thereof.

The moisture content in the web may be in the range of 3 to 30 weight-% before said calendering step, or more preferably 4 to 25 weight-% before said calendering step, or most preferably 5 to 20 weight-% before said calendering step.

The moisture content in the film is in the range of 2 to 10 weight-% after said calendering step.

The aqueous suspension forming said web may comprise any conventional additives or chemicals, wherein said additives or chemicals are any one of retention aids, wet strength chemicals, optical agents, drainage chemicals, biocides, lubricants, defoaming agents, dry strength chemicals, cross linking chemicals and filler or a combination thereof.

According to the first aspect the web may further be surface treated prior to said calendering step, and wherein said surface treatment includes providing said web with any one of a surface sizing agent and a slipping agent, a superfine microfibrillated cellulose, a polysaccharide, being any one of a starch, carboxymethyl cellulose (CMC), guar gum, hemicellulose and pectin, or a metal salt or a mixture or combination of said surface treatments.

The surface treatment is provided to further improve the properties of the web. For instance, a slipping agent may prevent that the web sticks to the calender surface. Because of possible unevenness in the web, having lower caliber points, it is advantageous to use additives that reduces friction in calendering in order to avoid formation of pinholes etc. . . . Suitable slipping agents may be stearates, preferably calcium stearate, waxes preferably polyethylene wax or AKD wax, fatty alcohol emulsions and/or silicone.

Addition of a superfine microfibrillated cellulose may also prevent the web from sticking to the calender surface. The superfine microfibrillated cellulose preferable has a surface area above 50, more preferably above 100 and most preferably above 150 $m^2/g$. The superfine MFC is preferably produced by treating MFC fibrils in their never-dried state and carefully dried as described in (Svensson A, Larsson P T, Salazar-Alvarez G, Wågberg L (2013) Preparation of dry ultra-porous cellulosic fibers: characterization and possible initial uses. Carbohydr Polym 92(1):775-783), using ethanol, acetone and finally pentane in several repeated steps. The MFC fibrils in pentane are thereafter dried by in inert gas (N2) before characterization by BET N2 gas adsorption. The surface area is determined using N2 physisorption using the Brunauer-Emmett-Teller (BET) isotherm (Brunauer S, Emmett P H, Teller E (1938) Adsorption of gases in multimolecular layers. J Am Chem Soc 60:309-319). The method according to the first aspect may further comprise the step of activating said web through flame, corona, plasma techniques.

The film may further be provided with a lamination layer on at least one side thereof, after said calendering step.

The web may further be provided with cross-linking agents, such as polycarboxylic acids or glyoxal. These cross-linking agents may cure during the calendering of the web, thus providing the film with desired properties such as improved moisture resistance and thus improved barrier properties.

The method according to the first aspect may further comprise a step of cooling said film after said calendering step. The cooling may even further improve the barrier properties of the film.

The method according to the first aspect may comprise a step of pre-moisturizing said web prior to said calendering step. The pre-moisturizing may be performed by using steam or water with or without chemicals, such as polyethylene glycol (PEG).

The film may have a specific formation number of below 0.60 $g^{0.5}/m$, or below 0.45 $g^{0.5}/m$, or below 0.40 $g^{0.5}/m$.

The nanocellulose may be any one of a microfibrillated cellulose and a nanocrystalline cellulose.

According to a second aspect there is provided a film having an OTR value in the range of 0.1 to 200 $cc/m^2*24$ h at 23° C., 50% relative humidity (RH), comprising at least 60% by weight nanocellulose based on the weight of the total amount of fibers in the film, or an OTR value in the range of 0.1 to 2000 $cc/m^2*24$ h at 38° C., 85% RH obtained by the method according to the first aspect.

The film may be any one of a freestanding film and a lamination layer on a polymer substrate, a paper or a paperboard.

According to a third aspect there is provided the use of a film according to the third aspect for any one of packaging or food application.

BRIEF DESCRIPTION OF DRAWINGS

The invention will now be described in more detail, with reference to the attached drawings.

DESCRIPTION OF EMBODIMENTS

Figure 1:
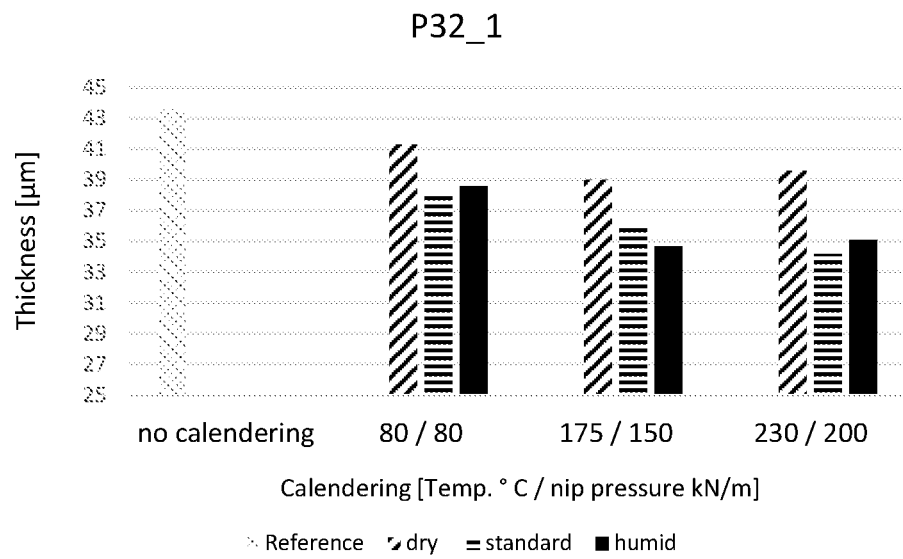
FIG. 1 is a graph showing the measured thickness for the treated samples of example 4.

In the inventive method a film is formed having an improved, i.e. lower OTR value in tropical conditions, In the specification hereof a "film" is described, by which is here meant an end product film, i.e. the film after a calendering and optional subsequent process steps. Non-calendered and non-modified film conventionally have poor OTR values at a high relative humidity. Alternatively, only one side of the film is treated for one-directional moisture control and the other side may be exposed to moisture at longer times, and therefore it is necessary to provide the film itself with at least some moisture resistance.

Further, according to the inventive method a web is firstly formed from an aqueous suspension.

The aqueous suspension comprises nanocellulose to at least 60% by weight of the total amount of fibers in the suspension. The suspension may also contain other substances such as nanofillers, retention or drainage chemicals, optical chemicals, nanofillers, cross-linking aids, lubricants, etc. In one alternative the aqueous solution comprises nanocellulose to at least 80% by weight of the total amount of fibers in the solution.

By nanocellulose is meant any one of microfibrillated cellulose (MFC) and/or nanocrystalline cellulose.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber). It is beneficial also to have relatively large portion of very long microfibrils (>50 um) to ensure good mechanical properties of the films which stands easily mechanical tension and stress of the calendering without problems.

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

The microfibrillated cellulose preferably has a Schopper Riegler value) (SR°) of more than 90. According to another embodiment the MFC may have a Schopper Riegler value (SR°) of more than 93. According to yet another embodiment the MFC may have a Schopper Riegler value (SR°) of more than 95. The Schopper-Riegler value can be obtained through the standard method defined in EN ISO 5267-1. This high SR value is determined for a pulp, with or without additional chemicals, thus the fibers have not consolidated into a film or started e.g. hornification. The dry solid content of this kind of web, before disintegrated and measuring SR, is less than 50% (w/w). To determine the Schopper Riegler value it is preferable to take a sample just after the wire section where the wet web consistency is relatively low. The skilled person understands that paper making chemicals, such as retention agents or dewatering agents, have an impact on the SR value. The SR value specified herein, is to be understood as an indication but not a limitation, to reflect the characteristics of the MFC material itself.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolyzed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper. The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

According to one alternative the MFC is produced and used as a never dried material. This reduces problems with hornification of the cellulose before calendering. The MFC may be produced from never dried pulp, and the MFC is not subsequently dried. Further to this the use of non-hornificated MFC provides for a web or film which is more easily plasticized during calendaring and hence, the desired densification and caliper effect may be achieved.

The aqueous suspension may comprise normal fibers in a range of 0 to 20%. By normal fibers is meant normal pulp fibers of a conventional length and fibrillation for paper making. Normal fibers may include any one of mechanical pulp, thermochemical pulp, chemical pulp such as sulphate or sulphite pulp, dissolving pulp, recycled fiber, organosolv pulp and chemi-thermomechanical pulp (CTMP). The film may also comprise reject from film manufacturing. The normal fibers can be vegetable fibers such as wood derived or agricultural sources including straw, bamboo, etc.

The normal fibers may have a beating degree, i.e. Schopper-Riegler value, in the range of 15 to 50 or more preferably in the range of 18 to 40. The normal fibers may preferably be a chemical pulp.

The normal fibers may have an average length in the furnish in the range of 1 mm to 5 mm, more preferably in the range of 2 to 4 mm.

The aqueous suspension may further comprise any conventional paper making additives or chemicals such as wet strength agents, fillers, (internal) sizing agents, colorants and slipping agents. Non-limiting examples of such additives and chemicals are wet end starch, silica, bentonite, precipitated calcium carbonate, wet-strength resin, cationic polysaccharide, sizing agents, such as AKD, ASA, resins, bentonite, stearate etc. These agent or chemicals may thus be process chemicals or film performance chemicals added to provide the end product film with specific properties and/or to facilitate the production of the film.

The web may also be provided with cross-linking agents such as any one of various mineral acids such as citric acid, or cross-linkers such as glutaraldehyde, urea-formaldehyde (UF), melamine-formaldehyde (MF) and polyamide-epichlorohydrin (PEA) and combinations thereof.

This web may be formed in a conventional papermaking machine, and through conventional techniques such as through wet laid techniques, such as e.g. papermaking processes, or at least a modified papermaking process.

These processes may include wet wire formation, foam formation on a wire, cast coating on a substrate etc.

In a wire forming technique a suspension, comprising nanocellulose fibers, is dewatered on a porous surface to form a fibrous web. A suitable porous surface is e.g. wire in a paper machine. The fibrous web is then dried in a drying section in a paper machine to form the web, wherein the web has a first side and a second side.

In a cast coating technique, a suspension, comprising for instance nanocellulose, is applied on a supporting substrate as a coating layer on the substrate. The supporting substrate is e.g. a paper, a paperboard, a metal belt, a plastic or a polymer substrate on which the suspension is evenly spread and a web is formed during drying. The formed web is then left on the supporting substrate as a coating layer or peeled off from the supporting substrate. The coating or coating layer may be provided to the substrate by any conventional coating techniques known in the art. These include for instance cast coating, roll coating, spray coating, foam coating, printing and screening techniques, blade coating, film press, surface sizing, curtain coating, rotogravure, reverse gravure and kiss coater.

The web, manufactured by any one of the techniques above has a first side and a second side, which second side faces away from the first side.

The web as provided in the inventive method has an oxygen transmission rate value in the range of 50 to 10 000 10 000 cc/m$^2$*24 h at 23° C., 50% RH, or more preferably in the range of 500 to 5000 cc/m$^2$*24 h at 23° C., 50% RH before said calendering step. It is well-known to the skilled person how to achieve a web having this OTR value based on the raw materials and components provided in this invention.

The oxygen transmission rate is measured according to ASTM D-3985 standard.

After the formation of the web, it may be dewatered or dried through any conventional techniques, such as air drying, contacting it with hot or warm cylinder, or through vacuum etc. . . . The dried web is thereafter calendered wherein said film is formed.

The moisture content of the web may be in the range or 2 to 10 weight-%, or more preferred in the range of 3 to 8 weight-% before being processed in a calendering step. The calendering step is thus preferably performed on relatively moist webs, i.e. webs having a moisture contents higher than 8 weight-%.

According to the inventive method the web is then processed in a calendering step.

According to one alternative the web is calendered in the nip between two soft nip cylinders. This also includes the alternative to calender in an extended nip.

According to another embodiment the web is calendered between one soft cylinder and one hard cylinder. Yet another alternative include that the web is calendered in a hard-nip calender, supercalender, multi-nip calender, shoe-nip calender, or metal belt calender. To provide the desired conversion of the film, the contact time-pressure profile- and temperature should be adjusted accordingly. In one alternative the calendering step may also be performed in the roll nips located in/between the machine drying section, where there, after calendering, is an extra drying step, such as for instance the nips in Yankee cylinders and locations where normally a size press is located.

Either one side of the film is treated, i.e. calendered, or both sides may be treated.

The calender step may be performed either on-line or off-line.

According to one embodiment the web may be pre-moisturized before the calendering step. It may also be possible to add moisture during calendering to optimize the calendering of the web.

In the calendering step the temperature of the cylinder or cylinders may be at least 60° C., or at least 80° C., or more preferred at least 100° C., and most preferred at least 140° C. The temperature or the heated cylinder, roll, rolls, or metal belt will depend on the calendaring process. The cylinders may have the same or different temperatures.

The nip pressure or line load is preferably at least 40 kN/m, and more preferably at least 50 kN/m, or even more preferably at least 100 kN/m.

The machine speed may be at least 50 m/min.

The film may be cooled subsequent to the calendering step, or between two calendaring steps. The cooling is preferably performed such that the temperature difference is at least 10° C., or at least 20° C., or at least 30° C. or at least 50° C.

The web may be activated with flame, corona, plasma etc. before the calendering step.

The web may be surface treated, such as through coating or sizing, prior to the calendering step. Such surface treatment may include superfine microfibrillated cellulose, or a polysaccharide, such as any one of starch, carboxymethyl cellulose (CMC), guar gum, hemicellulose and pectin or a combination thereof.

The web may alternatively be treated with metal salts before the calendering step.

The film that has been calendared according to the inventive method has an oxygen transmission rate value of in the range of 0.1 to 200 cc/m$^2$*24 h at 23° C., 50% relative humidity (RH), more preferably in the range of 0.1 to 100 cc/m$^2$*24 h at 23° C., 50% relative humidity (RH).

According to the inventive method the film has an OTR value in the range of 0.1 to 2000 cc/m$^2$*24 h at tropical conditions, i.e. at 38° C. and at least 65% RH or even 85% RH. The OTR value is even more preferably less than 200 cc/m$^2$*24 h at 38° C. and 85% RH, or less than 100 cc/m$^2$*24 h at 38° C. and 85% RH, and most preferably less than 50 cc/m$^2$*24 h at 38° C. and 85% RH.

The film has a specific formation number of below 0.60 g$^{0.5}$/m or even below 0.45 g$^{0.5}$/m. The specific formation number is measured by use of Ambertec Beta Formation instrument according to standard SCAN-P 92:09. Specific formation value is calculated as formation divided by the square root of the film grammage. The formation number of the film is important as a good formation provides densification of the film and more evenly distributed fibers.

The basis weight of the film may be in the range of from 5-50 g/m$^2$, more preferably in the range of from 10 to 40 g/m$^2$ and most preferably in the range of from 15 to 35 g/m$^2$. If nanocellulose fibers is coated on a carrier substrate (cast coating)—then basis weight of the film may however be even lower.

The thickness variations of the film after calendering is reduced by at least 5% or at least 10%.

The moisture content of the film after the calendering step may be in the range of 2 to 10 weight-%. The film may thus be relatively moist even after calendering, which is beneficial for the barrier properties.

According to one alternative the film may further be provided with a lamination layer. This layer may be provided to the film either at the same time as the film is calendered or after. The lamination layer may comprise any one of polyethylene (PE lamination), high density PE, low density PE or mixtures thereof, polypropylene (PP), polylactic acid (PLA), or ethylene vinyl alcohol (EVOH) and starches or waxes. This lamination may even further improve the OTR value of the film.

The lamination may be performed through any conventional technique, such as extrusion coating, lamination, or metallization. Also varnishing or converting on a printing press is possible.

The film can then be further laminated on paperboard or e.g. used as a free standing film or then the latter can be laminated between two polymer films.

Trials

EXAMPLE 1

Trials were conducted on a pilot paper machine with running speed of 15 m/min and 9 m/min to produce a MFC film from softwood (B) and hardwood (C) kraft pulp, respectively. In addition to MFC, a number of process and performance chemicals comprising any one of retention aids, wet strength chemicals, optical agents, drainage chemicals, biocides, lubricants, defoaming agents etc. was added. Table 1 summarizes the samples.

TABLE 1

Samples example 1

| | B | C |
|---|---|---|
| Fiber source, % | MFC (softwood) | MFC (hardwood) |
| Grammage, g/m$^2$ | 30.8 | 27.4 |

The MFC webs B and C produced on a pilot paper machine were calendered using a soft-nip laboratory calender. The results of the trials carried out are disclosed in Table 2 where the measured oxygen transmission rates (OTR) for the treated samples, i.e. formed films, are disclosed.

In order to evaluate the effect of calendering of MFC films on PE-coating, the calendered MFC films B and C were extrusion PE-coated with 25 g/m$^2$ of LDPE, i.e. the samples given in Table 1 were PE coated. Measurements were made at 50% relative humidity (RH) and 23° C. temperature and 85% relative humidity (RH) and 38° C. temperature after conditioning the samples to equilibrium moisture content in the same conditions.

TABLE 2

Test results

| Sample | Calendering | OTR 23° C./ 50% RH | OTR 38° C./ 85% RH | OTR 23° C./ 50% RH, PE-coated | OTR 38° C./ 85% RH, PE-coated |
|---|---|---|---|---|---|
| B | no calendering | 22.7 | 221 | 2.3 | 126 |
| | 40 kN/m and 80° C. | 5.0 | 207 | 2.3 | 90 |
| | 80 kN/m and 80° C. | 3.9 | 164 | n.d. | 92 |
| | 80 kN/m and 175° C. | 2.5 | 148 | n.d. | 58 |
| | 150 kN/m and 175° C. | 2.9 | 124 | n.d. | 58 |
| C | no calendering | 14.5 | n.d. | 1.5 | 148 |
| | 40 kN/m and 80° C. | 4.0 | 1570 | 1.4 | 99 |
| | 80 kN/m and 80° C. | 3.5 | 1103 | 1.1 | 88 |
| | 80 kN/m and 175° C. | 2.4 | 136 | 0.5 | 70 |
| | 150 kN/m and 175° C. | 2.3 | 124 | 0.6 | 71 |

The trials show that by calendering the web the oxygen barrier properties of MFC film can be improved and also the oxygen barrier properties of the MFC film after PE-coating, especially in tropical conditions (i.e. at 85% RH, 38° C.).

EXAMPLE 2

A surface sized MFC web sample manufactured as sample B in example 1 with a moderate oxygen transmission rate, was calendered using a soft-nip laboratory calender. Different temperatures and nip pressures were used during the experiments and some test points were run several times through the calender. The samples were characterized for their light transmittance, Bendtsen and PPS roughness and thickness values. For selected samples, oxygen transmission rates were also recorded at 65% relative humidity. The OTR value was determined at elevated relative humidity since it was considered to better reveal the possible differences between the samples.

The results, gathered in Table 3, reveal that depending on the calendering conditions, the light transmittance can be increased and thickness, roughness and oxygen transmission rate of the MFC film can be reduced (i.e. oxygen barrier properties can be improved by calendaring).

The calendering conditions should thus be optimized with respect to the desired property. A substantial drop in OTR value could be reached already with relatively mild calendering (80° C., 50 kN).

TABLE 3

Effect of laboratory calendering on properties of initially porous film sample.

| Temp., ° C. | Pressure, kN | Light TR, % @ 300 nm | Light TR, % @ 600 nm | Thickness, μm | Bendtsen roughness, ml/min | PPS roughness, μm* | OTR, cc/ (m$^2$* 24 h)** |
|---|---|---|---|---|---|---|---|
| Uncalendered (ref.) | | 55.9 | 70.1 | 37.5 | 359 | 5.31 | 1115 |
| 80 | 50 | 58.4 | 73.1 | 33.4 | 159 | 4.70 | 225 |
| 120 | 100 | 58.8 | 74.1 | 32.6 | 83 | 4.09 | 434 |
| 175 | 150 (3x cal.) | 57.4 | 72.9 | 35.9 | 62 | 3.91 | 290 |

*the given PPS roughness was determined with 1.0 MPa clamping pressure
**determined at 65% relative humidity and 23° C. temperature

EXAMPLE 3

Trials were conducted on a pilot paper machine with running speed of 15 m/min to produce a MFC film from softwood kraft pulp with an addition of hardwood or softwood kraft pulp in the MFC. In addition to MFC conventional wet end chemicals were added, such as for instance wet-strength chemicals, fillers, sizing agents etc.

Test point P11_1 was the reference containing 100% MFC as fiber source.

In test points P11_3, and P11_4 there were 30 wt-%, and 50 wt-% of hardwood fibers mixed with MFC in the pulper, respectively, followed by mixing with fiberizer of the fibers and MFC. In test point P11_5 and P11_6 there were 15 wt-% of softwood fibers mixed with MFC in the pulper followed by mixing with fiberizer of the fibers and MFC.

Table 4 summarizes the test points.

TABLE 4

Test points.

| | P11_1 | P11_3 | P11_4 | P11_5 | P11_6 |
|---|---|---|---|---|---|
| Fiber source, % | MFC | MFC 70 Birch 30* | MFC 50 Birch 50* | MFC 85 Pine 15* | MFC 85 Pine 15* |
| Grammage, g/m² | 35.7 | 32.3 | 32.2 | 31.9 | 32.4 |

*long fibers added to pulper, mixing together with MFC with fiberizer

The MFC webs produced on a pilot paper machine were calendered using the soft-nip laboratory calender. Samples were compared against commercial non-siliconized grease-proof paper (GP). The results of the trials carried out are disclosed in Table 5 where the measured Oxygen transmission rates (OTR) for the treated samples is disclosed.

In order to evaluate the effect of the calendering of MFC films on PE-coating the calendered MFC films were extrusion PE-coated with 25 g/m² of LDPE, i.e. the samples in Table 5 were PE coated. Measurements were made in 50% relative humidity (RH) and 23° C. temperature after conditioning the samples to equilibrium moisture content in the same conditions.

TABLE 5

Test results.

| Sample | Calendering | OTR 23° C./ 50% RH | OTR 23° C./50% RH, PE-coated |
|---|---|---|---|
| P11_1 | no calendering | 30.4 | 1.7 |
| | 80 kN/m and 80° C. | n.d. | n.d. |
| | 150 kN/m and 175° C. | 9.3 | 1.7 |
| P11_3 | no calendering | Fail | 91 |
| | 80 kN/m and 80° C. | Fail | 55 |
| | 150 kN/m and 175° C. | Fail | 57 |
| P11_4 | no calendering | Fail | 525 |
| | 80 kN/m and 80° C. | Fail | fail |
| | 150 kN/m and 175° C. | Fail | fail |
| P11_5 | no calendering | Fail | 365 |
| | 80 kN/m and 80° C. | Fail | fail |
| | 150 kN/m and 175° C. | Fail | 60 |
| P11_6 | no calendering | Fail | 100 |
| | 80 kN/m and 80 C. | Fail | 95 |
| | 150 kN/m and 175 C. | Fail | 237 |
| GP | no calendering | Fail | fail |
| | 80 kN/m and 80° C. | Fail | fail |
| | 150 kN/m and 175° C. | Fail | fail |

Fail means that the OTR value is over 10 000 cc/m2*24 h

With calendering the oxygen barrier properties of MFC film was to be improved with test point P11_1 and also the oxygen barrier properties of the MFC film after PE-coating was improved.

However, calendering of webs containing MFC that had OTR over 10 000 cc/m2/24 h did not result in improved OTR values. After PE-coating some of the films showed improved OTR results after calendering.

EXAMPLE 4

Trials were conducted on a pilot paper machine with running speed of 30 m/min to produce a MFC film from softwood Kraft pulp with an addition of hardwood or softwood Kraft pulp in the MFC. In addition to MFC, conventional wet end additives and chemicals were added, such as wet-strength chemicals, fillers and sizing agents. Test point P32_1 contained possibly flocculated/agglomerated MFC and test point P32_5 contained more individualized fibrils/dispersed MFC.

Table 6 summarizes the test points and their results oxygen barrier properties.

TABLE 6

Test points

| | P32_1 | P32_5 |
|---|---|---|
| Fiber source, % | MFC | MFC |
| Grammage, g/m² | 30.8 | 30.1 |
| OTR 38° C./85% RH, cc/m2*24 h | 2160 | 88 |

The MFC webs produced on a pilot paper machine were calendered using the soft-nip laboratory calender. Samples were conditioned before calendering, by drying (oven-drying) at 105° C., standard means conditioned at 23° C./50% RH, and tropical means conditioned at 38° C./85% RH.

Figure 2:
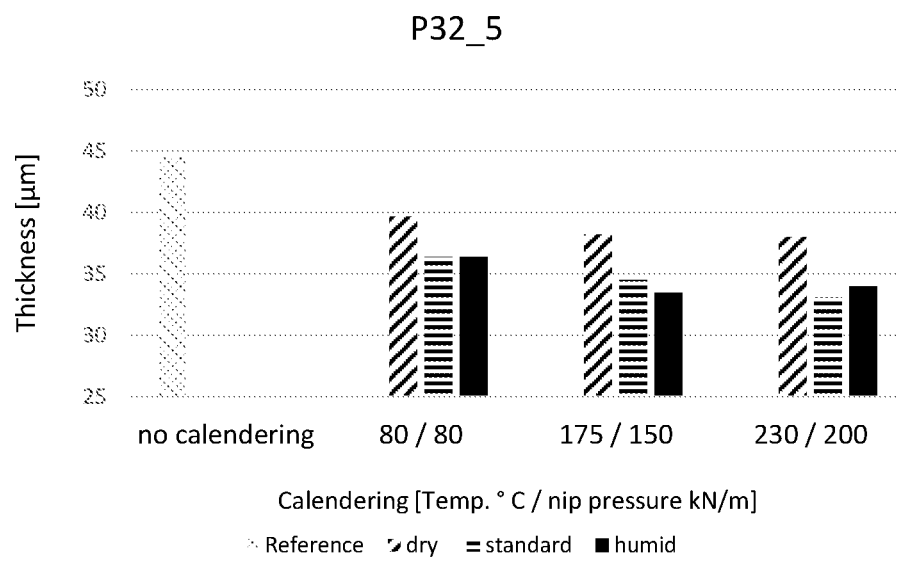
FIG. 2 is a graph showing the measured thickness for the treated samples of example 4.

The results of the trials carried out are disclosed in FIGS. 1 and 2, where the measured thickness for the treated samples is disclosed.

The results of the trials carried out are disclosed in Table 7 where the measured Oxygen transmission rates (OTR) for the treated samples is disclosed. Measurements were made in 85% relative humidity (RH) and 38° C. temperature after conditioning the samples to equilibrium moisture content in the same conditions.

TABLE 7

Test results

| Sample | Calendering 175° C./150 kN/m | OTR 38° C./85% RH |
|---|---|---|
| P32_1 | dry | fail |
| | standard | 427 |
| | humid | 114 |
| P32_5 | dry | 65 |
| | standard | 320 |
| | humid | 52 | fail = OTR is over 10 000 cc/m2*24 h

Results shown in FIGS. 1 and 2 and Table 1 suggest that with calendering the oxygen barrier properties of MFC film can be decreased if the film is substantially dry before calendaring (test point P32_1 dry), this means that although the film is densified (thickness is reduced) due to calendaring the treatment causes negative effect to the oxygen barriers, thus best results are gained when the films are not too dry, i.e. have some initial moisture. In case the oxygen barrier properties of MFC film are good, the OTR value was not worsened if the film was calendered as substantially dry (test point P32_5 dry).

In view of the above detailed description of the present invention, other modifications and variations will become apparent to those skilled in the art. However, it should be apparent that such other modifications and variations may be effected without departing from the spirit and scope of the invention.

The invention claimed is:

1. A method of manufacturing a film having an oxygen transmission rate (OTR) value in the range of 0.1 to 2000 cc/m2*24 h at 38° C. at 85% RH, said film comprising at least 60% by weight nanocellulose based on the weight of the total amount of fibers in the film, wherein the method comprises the steps of:
providing an aqueous suspension comprising nanocellulose wherein said nanocellulose comprises any one of a microfibrillated cellulose and a nanocrystalline cellulose;
forming a web from said aqueous suspension wherein the moisture content in the web is in the range of 3 to 30 weight-%;
calendering the web at a line load of at least 40 kN/m, and at a temperature of at least 60° C. to form said film; wherein
the web has an OTR value in the range of 50 to 10 000 cc/m2*24 h at 23° C., 50% RH before said calendering step.

2. The method as claimed in claim 1, wherein the line load is at least 60 kN/m.

3. The method of claim 1, wherein the calendering is performed at a temperature of at least 80° C.

4. The method of claim 1, wherein said calendering step is performed in any one of a soft nip calender, an extended calender, a hard nip calender, a belt calender and a shoe calender.

5. The method of claim 1, wherein said aqueous suspension comprises more than 80% by weight nanocellulose based on the weight of the total amount of fibers in the film and/or additional fibers in a range of 0 to 20% by weight based on the weight of the total amount of fibers in the film, said additional fibers comprising mechanical pulp, thermochemical pulp, and chemical pulp.

6. The method as claimed in claim 5, wherein said additional fibers are a chemical pulp.

7. The method of claim 1, wherein the OTR value of said film is in the range of from 0.1 to 180 cc/m2*24 h at 23° C., 50% RH.

8. The method of claim 1, wherein the OTR value of said film in the range of 0.1 to 200 cc/m2*24 h at 38° C., 85% RH.

9. The method of claim 5, wherein said nanocellulose and/or normal fibers are any one of softwood and hardwood fibers or a mixture or combination thereof.

10. The method of claim 1, wherein the moisture content in the web is in the range of 4 to 25 weight-% before said calendaring step.

11. The method of claim 1 wherein the moisture content in the film is in the range of 2 to 10 weight-% after said calendaring step.

12. The method of claim 1, wherein the aqueous suspension forming said web comprises additives or chemicals, wherein said additives or chemicals are any one of retention aids, wet strength chemicals, optical agents, drainage chemicals, biocides, lubricants, defoaming agents, dry strength chemicals, cross linking chemicals and filler or a combination thereof.

13. The method of claim 1, wherein said web is further surface treated prior to said calendaring step, and wherein said surface treatment includes providing said web with any one of a surface sizing agent and a slipping agent, a microfibrillated cellulose, a polysaccharide, being any one of a starch, carboxymethyl cellulose (CMC), guar gum, hemicellulose and pectin, or a metal salt or a mixture or combination of said surface treatments.

14. The method of claim 1, wherein the method further comprises the step of activating said web through flame, corona, plasma techniques.

15. The method of claim 1, wherein said film is further provided with a lamination layer on at least one side thereof, after said calendaring step.

16. The method of claim 1, wherein said web is further provided with cross-linking agents.

17. The method of claim 1, wherein the method further comprises a step of cooling said film after said calendaring step.

18. The method of claim 1, wherein said method further comprises a step of pre-moisturizing said web prior to said calendaring step.

19. The method of claim 1, wherein said film has a specific formation number of below 0.60 $g^{0.5}$/m measured according to standard SCAN-P 92:09.

20. The method of claim 1, wherein said nanocellulose is the microfibrillated cellulose.

* * * * *